United States Patent [19]
Cattaruzzi

[11] Patent Number: 5,791,854
[45] Date of Patent: Aug. 11, 1998

[54] ROTATING TRAILER FOR HANDLING POULTRY CAGES

[76] Inventor: Bruno Cattaruzzi, Via Tosio 15, 25100 Brescia, Italy

[21] Appl. No.: 709,859

[22] Filed: Sep. 10, 1996

[51] Int. Cl.[6] .................................................. B65G 67/04
[52] U.S. Cl. ........................ 414/349; 414/482; 414/523; 414/539
[58] Field of Search ........................... 414/346, 349–351, 414/373, 469, 471, 482, 501, 507, 523, 539, 679; 298/8 R, 9; 198/314, 317

[56] References Cited

U.S. PATENT DOCUMENTS

| | | | |
|---|---|---|---|
| 1,471,339 | 10/1923 | Kinoshita | 298/9 |
| 1,910,398 | 5/1933 | Ludington | 414/350 X |
| 2,020,231 | 11/1935 | Bell | 414/346 |
| 3,285,385 | 11/1966 | Langner | 198/317 X |
| 3,604,579 | 9/1971 | Jenkins | 414/482 |
| 3,720,336 | 3/1973 | Murray et al. | 414/482 X |
| 3,724,168 | 4/1973 | Cassady, Jr. et al. | 414/523 X |
| 4,600,351 | 7/1986 | Nelson | 414/501 X |
| 4,756,660 | 7/1988 | Cesarini | 414/349 X |
| 5,228,280 | 7/1993 | Ratzlaff et al. | 56/341 |
| 5,297,665 | 3/1994 | Smith | 198/317 X |
| 5,476,353 | 12/1995 | Mola | 414/373 |

FOREIGN PATENT DOCUMENTS

| | | | |
|---|---|---|---|
| 0304228 | 5/1971 | U.S.S.R. | 198/314 |
| 0370162 | 4/1932 | United Kingdom | 198/314 |
| 2222995 | 3/1990 | United Kingdom | 198/314 |

*Primary Examiner*—James W. Keenan
*Attorney, Agent, or Firm*—Hovey, Williams, Timmons & Collins

[57] ABSTRACT

A trailer (10) for handling and rotating poultry cages (14,16) loaded by an automatic poultry catching device (12). The trailer (10) includes two rotating platforms (20,22) mounted to a chassis (18) for rotational movement about a single vertical axis extending through the chassis (18) and a turntable assembly (24) for rotating the platforms (20,22). The turntable assembly (24) rotates the rotating platforms (20,22) independently of one another so that one platform can be positioned in a poultry-loading position for loading poultry in the cages supported thereon and the other platform can be positioned in a cage-loading and unloading position for unloading the filled cages and replacing the filled cages with empty cages.

18 Claims, 5 Drawing Sheets

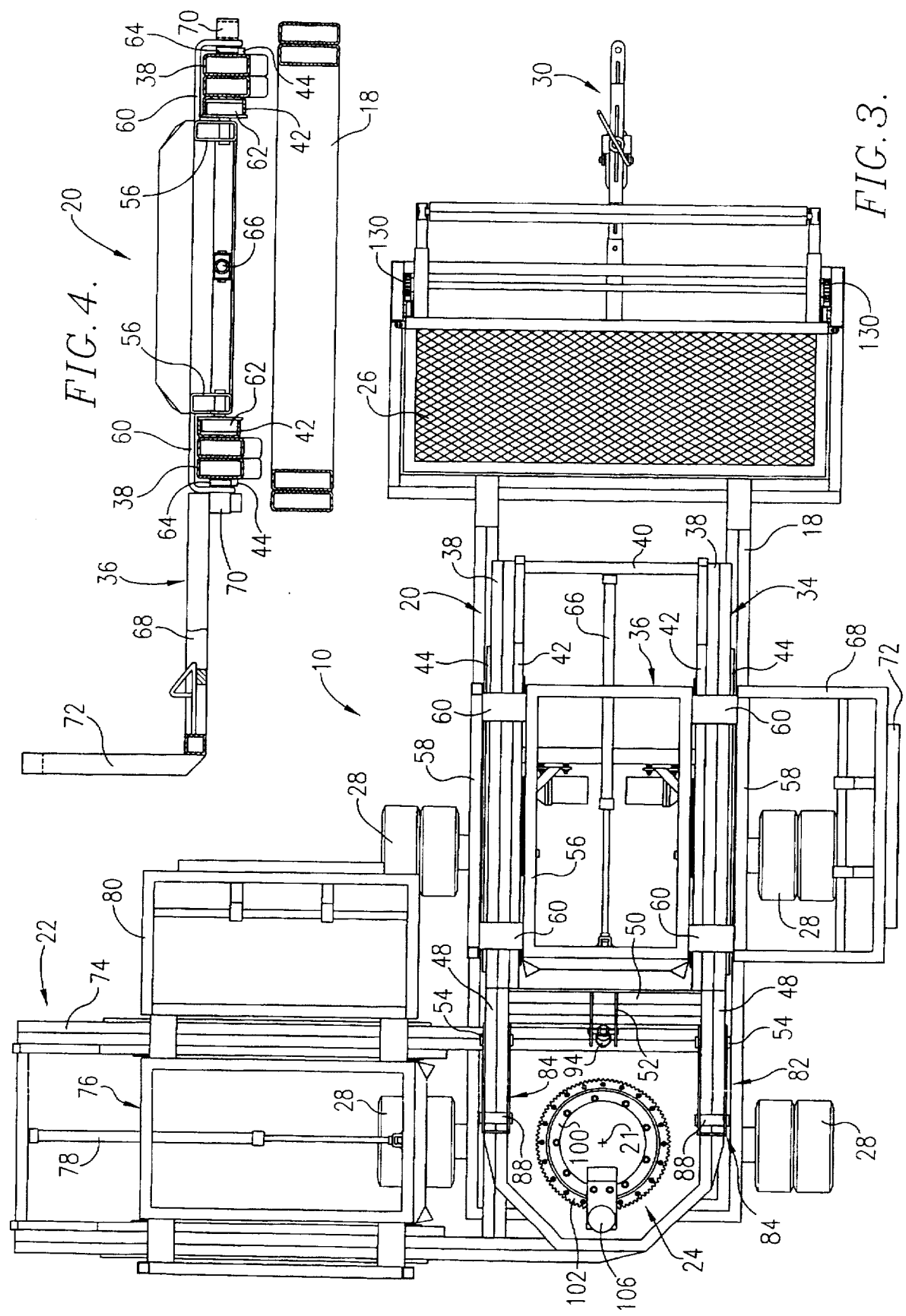

5,791,854

1

ROTATING TRAILER FOR HANDLING POULTRY CAGES

BACKGROUND OF THE INVENTION

1. Field of the Invention

The present invention relates to trailers for handling poultry cages loaded by automatic poultry catching devices. More particularly, the invention relates to such a trailer that more efficiently positions sets of cages between loading and unloading positions and that is easier and quicker to operate.

2. Description of the Prior Art

Poultry is typically transported from farms to poultry processing plants in sets of cages or coops. To reduce the time required to load the poultry in the cages, poultry catching devices that automatically catch the poultry and feed the poultry to the cages by conveyors have been recently developed. These poultry catching devices are becoming increasingly popular because they reduce poultry loading labor requirements.

To further reduce poultry loading times, rotating trailer apparatuses have been developed to more quickly position sets of cages for loading and unloading. The trailer apparatuses are typically designed to rotate one set of cages to a poultry-loading position to be loaded with poultry by a poultry catching device and rotate another, already filled set of cages, to a cage-loading and unloading position to be removed and replaced with an empty set of cages.

One known prior art trailer apparatus includes a large, main turntable rotatable about a vertical axis, and a pair of secondary, cage-supporting turntables mounted at spaced locations on the main turntable for rotation about their own separate vertical axes relative to the main turntable.

In this prior art apparatus, the main turntable rotates about the first vertical axis so that the cages supported on one of the secondary turntables can be loaded with poultry while the cages supported on the other secondary turntable can be removed and replaced with other cages. The secondary turntables then rotate about their vertical axes between poultry-loading positions and cage-removing positions.

Although prior art trailer apparatuses such as the one described above reduce the amount of time required to load poultry, they are costly to manufacture and difficult to operate because they include a plurality of turntable assemblies that rotate the cage-supporting platforms about a plurality of different vertical axes. The trailer apparatuses are provided with multiple turntables because in the United States and many other countries, poultry cages are designed to be filled with poultry from their fronts and picked up by forklifts from their sides. Thus, these prior art trailer apparatuses must first rotate the cages about a first axis to position one set of cages for poultry loading and then must rotate the other set of cages 90 degrees about a second axis to present the sides of the cages to the forklift.

OBJECTS AND SUMMARY OF THE INVENTION

Accordingly, it is an object of the present invention to provide an improved trailer apparatus for handling poultry cages that does not suffer from the limitations described above. More particularly, it is an object of the present invention to provide a trailer apparatus that more efficiently positions sets of cages between poultry-loading and cage-loading and unloading positions and that is easy to operate.

In view of these objects and other objects that become evident from the description of the preferred embodiments

2 of the invention herein, the present invention provides an improved trailer apparatus including a chassis, a first rotating platform mounted to the chassis for rotational movement about a vertical axis extending through one end of the chassis, a second rotating platform mounted to the chassis for rotational movement about the same vertical axis, and a turntable assembly for rotating the first and second rotating platforms about the vertical axis independently of one another.

The turntable assembly is operable for rotating one of the first and second rotating platforms to a poultry-loading position while independently rotating the other of the first and second rotating platforms to a cage-loading and unloading position. Once the cages on one of the rotating platforms have been filled with poultry and empty cages have been placed on the other rotating platform, the turntable assembly rotates the platform with the empty cages to an intermediate position while simultaneously or subsequently rotating the platform with the filled cages approximately 90 degrees to a cage-loading and unloading position. The turntable assembly then rotates the platform with the empty cages from the intermediate position to a poultry-loading position so that its cages can be loaded with poultry.

Advantageously, since the turntable rotates the first and second rotating platforms about the same vertical axis independently of one another, one platform can be positioned in a poultry-loading position while the other platform is positioned in a cage-loading or unloading position. Then, the platform with the empty cages can be independently rotated to an intermediate position so that the platform with the filled cages can be rotated to the cage-loading and unloading position. This permits the first and second platforms to rotate their respective cages between poultry-loading and cage-loading and unloading positions to accommodate poultry cages designed for use in the U.S. market without requiring a plurality of separate turntable assemblies that rotate the platforms about a plurality of different vertical axes. This also significantly decreases the time required to switch loaded cages with unloaded cages.

Additionally, since both the first and second rotating platforms are rotated about a single vertical axis by the same turntable assembly, the trailer apparatus of the present invention is easier to operate than prior art trailer apparatuses.

BRIEF DESCRIPTION OF THE DRAWING FIGURES

A preferred embodiment of the present invention is described in detail below with reference to the attached drawing figures, wherein:

FIG. 3 is a plan view of the trailer apparatus;

FIG. 4 is a vertical sectional view of the trailer apparatus taken along line 4—4 of FIG. 1;

3

Figure 7:
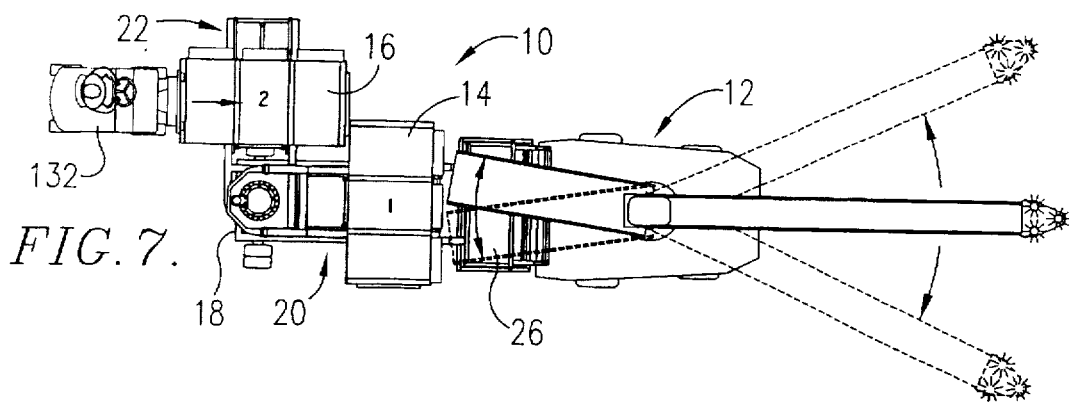
Figure 8:
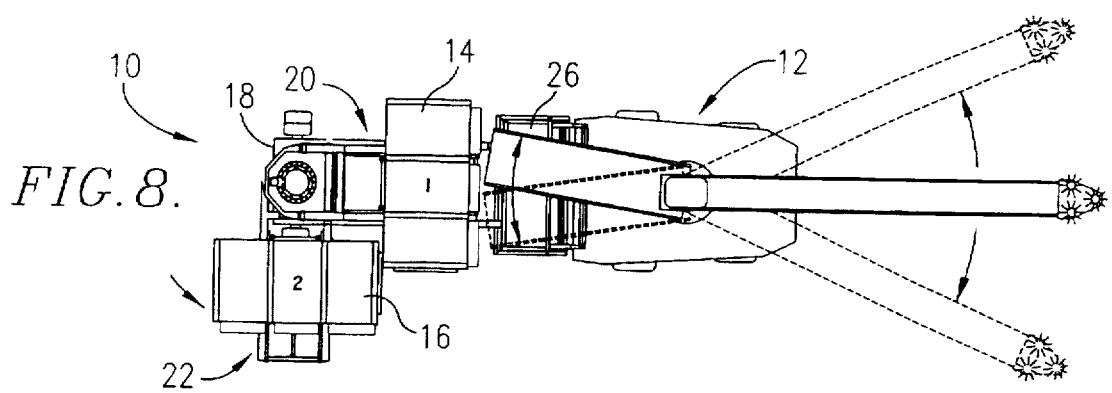
Figure 9:
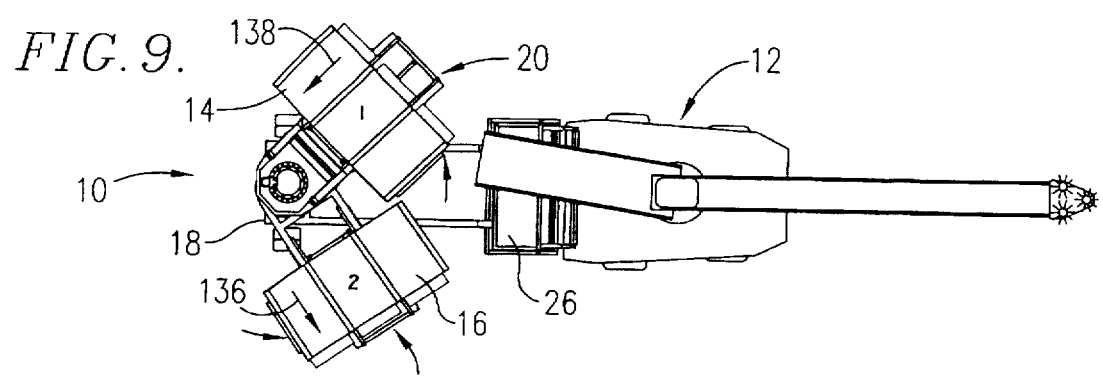
Figure 10:
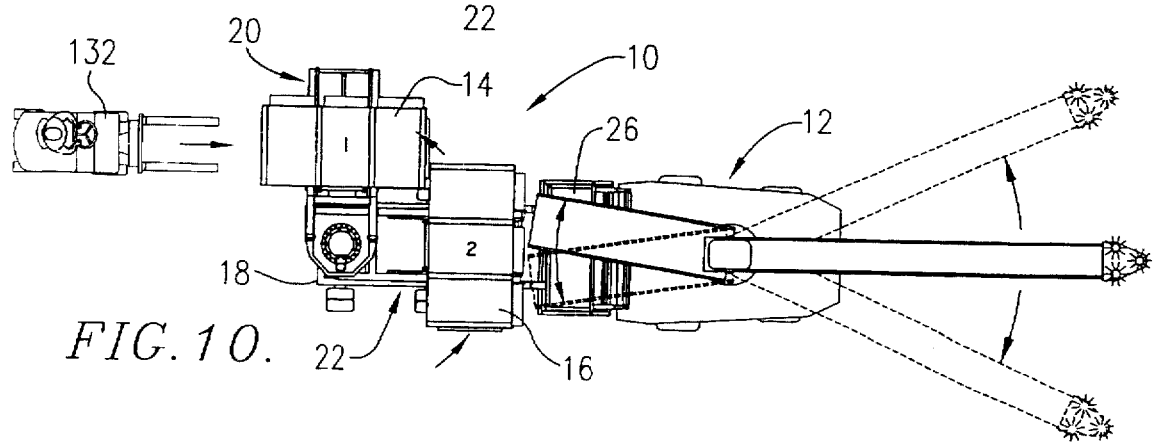

FIG. 7 is a schematic plan view of the trailer apparatus shown in use with an automatic poultry catching device with a first set of cages on one rotating platform being loaded with poultry and a second set of empty cages being loaded onto another rotating platform by a forklift;

FIG. 8 is a schematic plan view of the trailer apparatus showing the empty set of cages being rotated to an intermediate position; and FIG. 9 is a schematic plan view of the trailer apparatus showing a filled set of cages being rotated to their cage-unloading position and an empty set cages being rotated to their poultry-loading position; and FIG. 10 is a schematic plan view of the trailer apparatus showing the filled set of cages being removed from the apparatus and the empty set of cages being loaded with poultry.

DETAILED DESCRIPTION OF THE PREFERRED EMBODIMENTS

Figure 2:
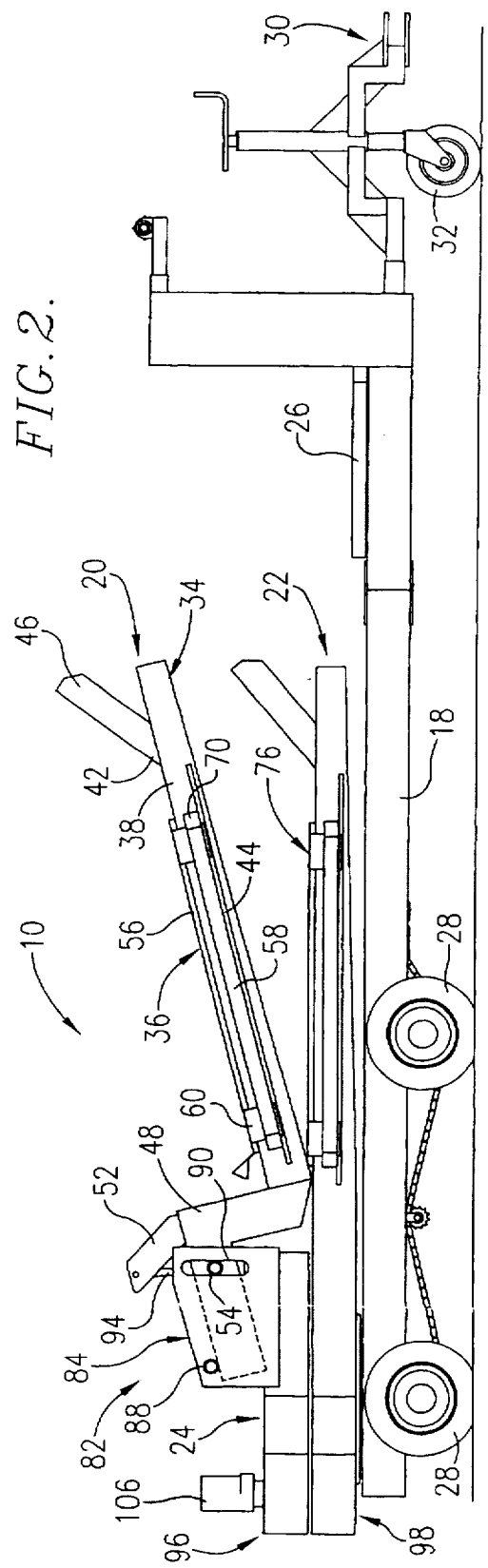
FIG. 2 is a side elevational view of the trailer apparatus showing the trailer apparatus in its transport position.

FIG. 2 illustrates an apparatus 10 incorporated into a trailer in accordance with a preferred embodiment of the present invention. As illustrated in FIGS. 7–10, the trailer apparatus 10 is designed for use with an automatic poultry catching device 12 and is operable for handling and rotating sets of poultry cages 14 and 16 between poultry-loading, cage-loading and unloading, and intermediate positions as discussed in more detail below.

The trailer apparatus 10 broadly includes a chassis 18, a first rotating platform 20 mounted to one end of the chassis for rotational movement about a vertical axis 21, a second rotating platform 22 mounted to the chassis for rotational movement about the same vertical axis 21, a turntable assembly 24 for rotatably mounting the platforms 20,22 on the chassis 18 and indexing the platforms into their various operating positions described below, a control assembly (not shown) for controlling the operation of the turntable assembly 24, and an operator's station 26 for supporting an operator during use of the trailer apparatus 10.

In more detail, the chassis 18 is preferably rectangular and is formed from conventional steel beams and crossbeams. The chassis includes a plurality of ground wheels 28 and a forwardly extending tongue 30 adapted for connection with the poultry catching device 12. The tongue 30 preferably includes a castor-type ground wheel 32 for supporting the forward end of the chassis 18 above the ground and a tongue jack for raising and lowering the tongue 30 for aligning it with the poultry catching device 12.

Figure 5:
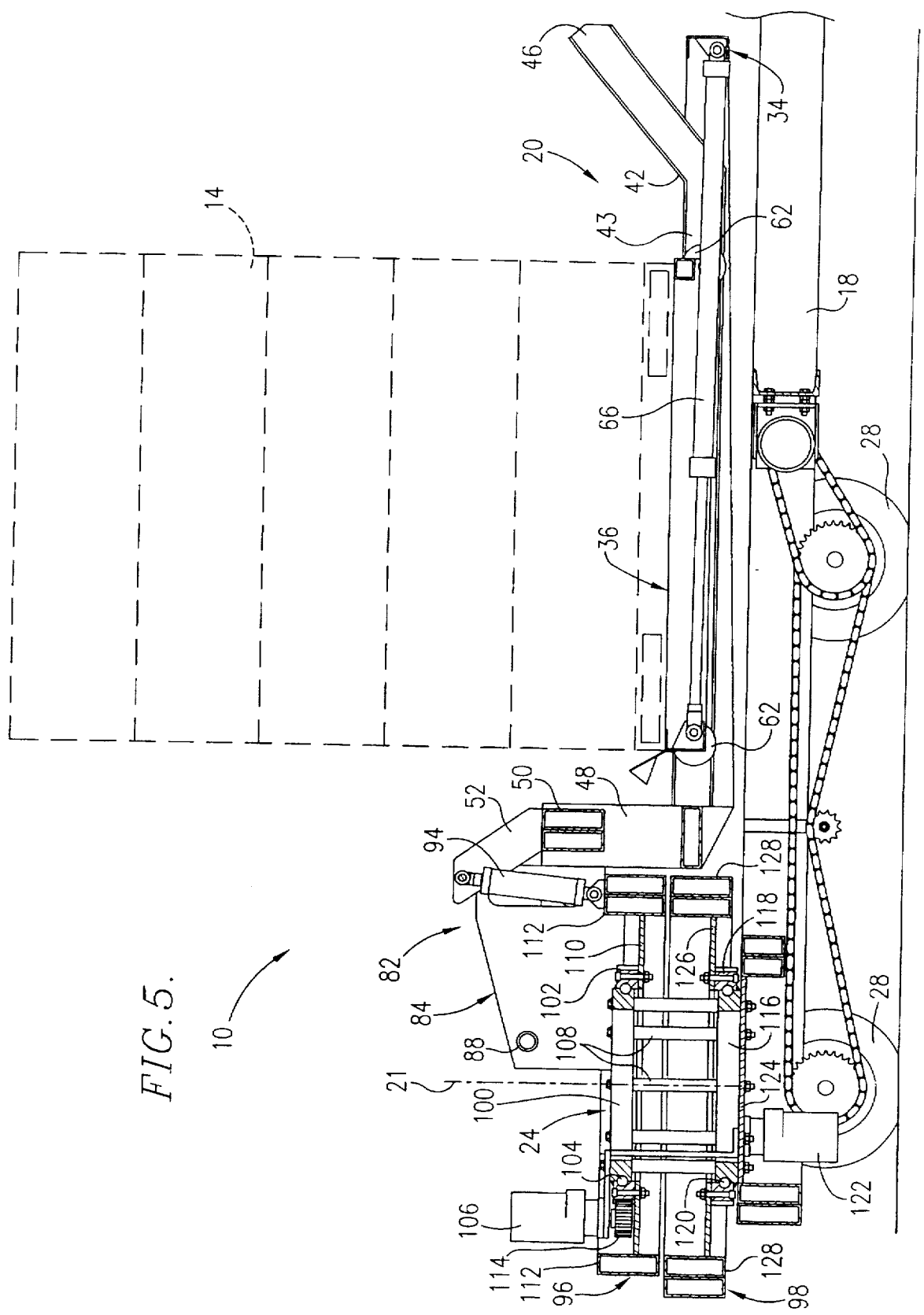
FIG. 5 is a longitudinal, vertical cross-sectional view of the trailer apparatus showing a set of poultry cages in their untilted position.

As best illustrated in FIG. 5, the first rotating platform 20 is configured for supporting and rotating a first set of cages 14. The platform 20 includes a base frame 34 and a tiltable, cage-receiving tray 36 carried by the base frame 34 as depicted in FIG. 3.

The base frame 34 is generally rectangular in shape and includes longitudinally extending side beams 38 and interconnecting cross beams 40. The base frame 34 also includes a pair of inverted, generally L-shaped beams 48 rigidly connected to the inner ends of side beams 38. As best illustrated in FIGS. 3 and 5, the beams 48 are interconnected by a horizontally extending cross beam 50. A pair of spaced apart, upwardly extending brackets 52 are attached to the top of the cross beam 50. As best illustrated in FIGS. 2 and 3, the horizontally extending portion of each beam 48 has a stub pipe 54 extending therethrough.

Tilting of the tray 36 to facilitate loading of cages 14 is accomplished by shifting the tray radially outward relative to base frame 34 while at the same time subjecting the tray to the action of a cam track arrangement. Once the cages 14 have been loaded or when empty cages are being positioned for loading, the tray 36 is shifted radially inward to position the cages closer to the turntable assembly 24 to prevent the apparatus from tipping over during rotation of the platform 20.

To this end, the base frame 34 includes a pair of inner tracks 42 mounted to the inside faces of the side beams 38 and a pair of outer tracks 44 mounted to the outside faces of the side beams 38. The inner tracks 42 are formed from beams or pipes that present an open, inwardly facing channel. Each inner track 42 includes a generally horizontally extending section 43 and an upwardly angled section 46.

As best illustrated in FIG. 3, the tray 36 includes a generally rectangular inner frame 56 positioned within the side beams 38 and a pair of outer beams 58 that are supported on opposite, outboard sides of base frame 34 by a plurality of L-shaped plates 60 that extend over and wrap partially around the side beams 38.

The inner frame 56 of the tray 36 has four rollers 62 mounted to its outside corners for engaging the inner tracks 42 of the base frame 34 as best illustrated in FIGS. 4 and 5. Similarly, a relatively smaller roller 64 is mounted to the inside face of each of the L-shaped plates 60 for engaging the outer tracks 44 of the base frame 34 as best illustrated in FIG. 4.

Figure 6:
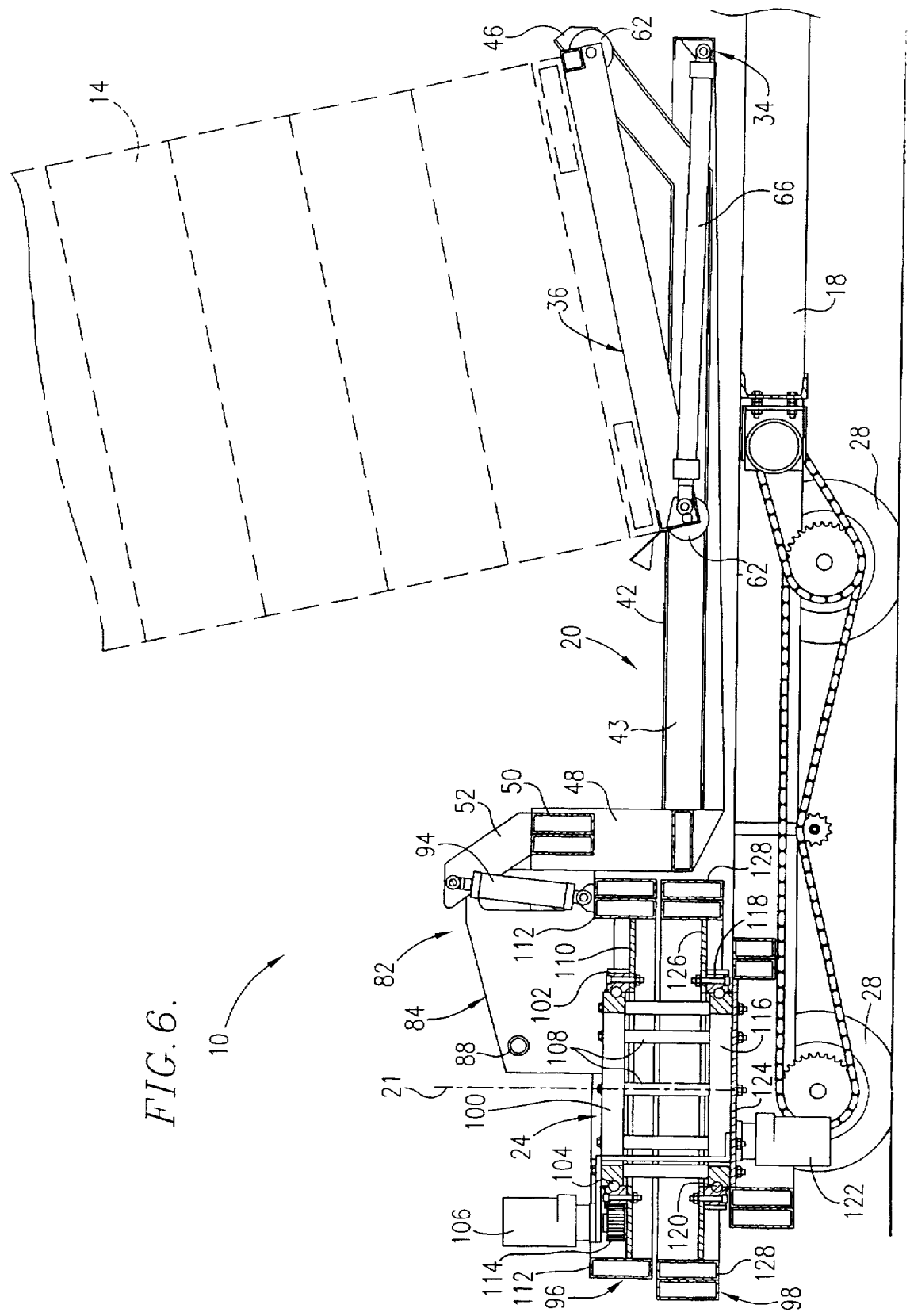
FIG. 6 is a longitudinal, vertical cross-sectional view of the trailer apparatus showing a set of poultry cages in their tilted position.

The rollers 62,64 and the tracks 42,44 permit the tray 36 to be shifted along the length of the base frame 34 between an untilted position illustrated in FIG. 5 and a tilted position illustrated in FIG. 6. When the tray 36 is in its untilted position, its wheels 62 are positioned entirely within the horizontal portion 43 of the inner tracks 42. This positions the cages 14 in a generally level position so that they may be easily picked up by a forklift as described in more detail below. This also positions the cages 14 closer to the turntable assembly 24 so that the apparatus 10 doesn't tip over during rotation of the platform 20.

When the tray 36 is in its tilted position, the two radially outer wheels 62 are disposed in the upwardly angled portions 46 of the inner tracks 42 as illustrated in FIG. 6. This elevates the front edges of the cages 14 relative to the rear edges of the cages and permits poultry that is loaded into the cages 14 to slide to the rear of the cages 14 as described in more detail below.

The tray 36 is shifted along the length of the base frame 34 between its tilted and untilted positions by a hydraulic piston and cylinder assembly 66. As best illustrated in FIG. 5, the cylinder of the assembly 66 is pivotally connected to an outer edge of the base frame 34, and the piston is pivotally connected to an inner edge of the tray 36. The assembly 66 is coupled with a conventional source of pressurized fluid and is controlled by the control assembly described below.

When the piston is extended, the assembly 66 shifts the tray 36 to its untilted position illustrated in FIG. 5. However, when the piston is retracted, the assembly 66 shifts the tray 36 to its tilted position illustrated in FIG. 6.

As best illustrated in FIGS. 3 and 4, the tray 36 also includes a generally rectangular shaped outboard extension frame 68 having a downwardly extending leg that is secured to a collar 70 integrally formed in the outer beam 58. The extension frame 68 supports the ends of a set of poultry cages 14 that are loaded on the tray 36 and includes an upstanding side rail 72 for confining the poultry cages 14. The extension frame 68 can be mounted to either side of the tray 36 to permit poultry cages 14 to be loaded and removed from either side of the platform 20.

The second rotating platform 22 is mounted to the chassis 18 for rotational movement about the same vertical axis 21 as the first rotating platform 20. The platform 22 is similar to the platform 20 and includes a base frame 74, a tiltable tray 76, and a hydraulic piston and cylinder assembly 78 for effecting the tilting of the tray 76. The tray 76 also includes an outboard extension frame 80.

As best illustrated in FIGS. 2 and 5, the platform 20 also includes structure generally referred to by the numeral 82 that permits the platform 20 to be selectively raised and lowered relative to the chassis 18 so that the platform 22 can be rotated directly under the platform 20. This permits the first and second rotating platforms 20,22 to be positioned in a stacked, relatively compact manner for facilitating transporting the trailer apparatus 10 over the road when not in use.

To this end, a pair of guides 84 are mounted to the turntable assembly 24. Each of the guides includes a pair of spaced apart, upstanding plates that are connected by a horizontally extending pipe 88. Each of the plates includes a vertically extending guide slot 90.

As best illustrated in FIG. 2, the L-shaped beams 48 of the base frame 34 are positioned between the plates of the guides 84 so that the pipes 54 are received within the guide slots 90 and the horizontal sections of the L-shaped beams 48 are positioned directly under the pipes 88. With this configuration, the L-shaped beams 48 can be selectively pivoted upwardly or downwardly within the guides 84 so that the platform 20 can be selectively shifted between a lowered position illustrated in FIG. 1 and a raised position illustrated in FIG. 2.

When the platform 20 is in its raised position, the platform 22 can be rotated directly thereunder for permitting the trailer apparatus 10 to be more easily transported. When the platform 20 is in its lowered position, it is operable for handling and rotating poultry cages 14 as described below.

The first rotating platform 20 is shifted between its lowered and raised positions by a hydraulic piston and cylinder assembly 94 mounted to the turntable assembly 24. As best illustrated in FIG. 5, the cylinder of the assembly 94 is pivotally attached to the turntable by a clevis and pin assembly, and the end of the piston is pivotally attached to the brackets 52 by a pin or bolt extending between the brackets 52. The assembly 94 is coupled with a conventional source of pressurized fluid and is controlled by the control assembly described below.

When the piston of the assembly 94 is shifted to its extended position as illustrated in FIG. 2, it raises the brackets 52 and pivots the L-shaped beams 48 to pivot upwardly about the pipes 88 extending through the guides 84. The pipes 54 extending through the L-shaped beams 48 shift upwardly in the guide slots 90 to guide the movement of the platform 20 as it is being raised.

Figure 1:
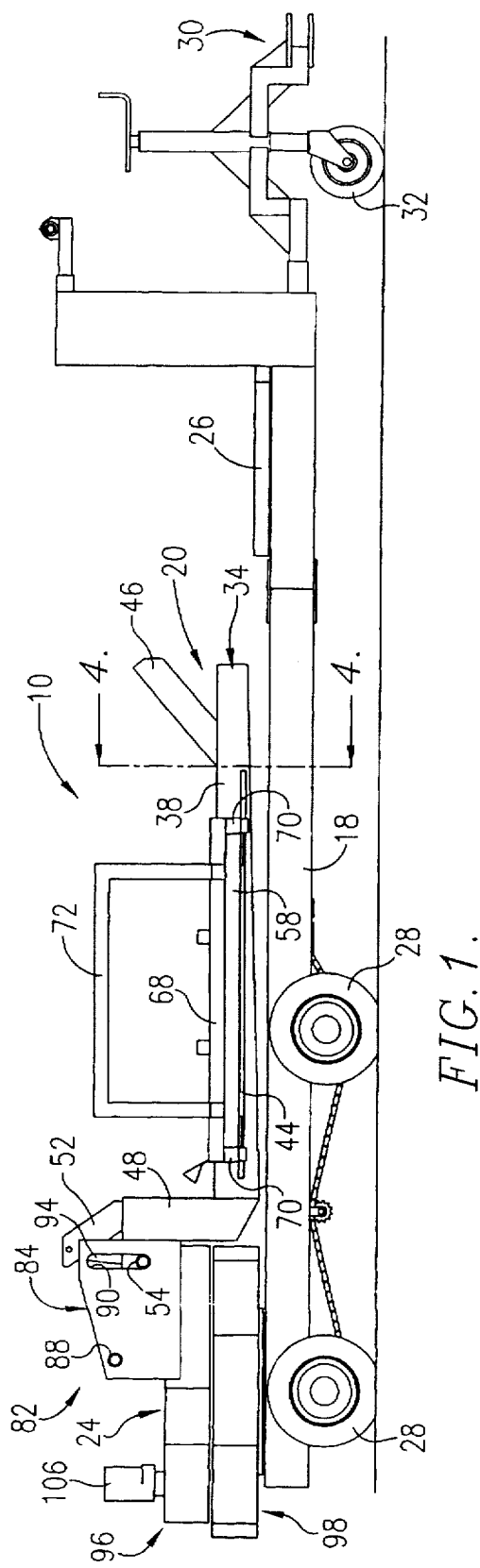
FIG. 1 is a side elevational view of a trailer apparatus constructed in accordance with a preferred embodiment of the invention showing the trailer apparatus in its operating position.

Conversely, when the piston of the assembly 94 is shifted to its retracted position illustrated in FIG. 1, it lowers the brackets 52 and pivots the L-shaped beams downwardly about the pipes 88. The pipes 54 shift downwardly in the guide slots 90 to guide the platform 20 to its lowered position.

The turntable assembly 24 is mounted between the chassis 18 and the first and second rotating platforms 20,22 for rotating the platforms 20,22 between various positions described below. As best illustrated in FIGS. 5 and 6, the turntable assembly 24 includes a first, upper turntable 96 for rotating the first rotating platform 20 and a second, lower turntable 98 for rotating the second rotating platform 22.

The first turntable 96 includes an inner stationary ring 100, an outer moveable ring 102 coaxially mounted to the periphery of the inner ring 100 by a bearing 104, and a hydraulic motor 106 for rotating the outer ring 102 relative to the inner ring 100. The inner ring 100 is bolted or otherwise connected to a plurality of vertically extending rods 108 which are in turn connected to the chassis 18 through the second turntable 98. Thus, the inner ring 100 remains stationary relative to the chassis 18.

The outer ring 102 is bolted to a support plate 110 which is in turn connected to an outer support frame 112. The support frame 112 is connected to the guides 84 of the first rotating platform 20. Thus, when the outer ring 102 is rotated relative to the inner ring 100, the support frame 112 rotates the first rotating platform 20.

The motor 106 is bolted to the inner ring 100 and includes a rotating pinion or drive gear 114. The periphery of the outer ring 102 is provided with gear teeth that intermesh with the drive gear 114. Thus, when the motor 106 rotates the drive gear 114, it rotates the outer ring 102 relative to the inner ring 100 and therefore rotates the support frame 112 and the first rotating platform 20.

The second turntable 98 is mounted about the same vertical axis 21 as the first turntable 96 and also includes an inner stationary ring 116, an outer moveable ring 118 coaxially mounted to the periphery of the inner ring 116 by a bearing 120, and a hydraulic motor 122 for rotating the outer ring 118 relative to the inner ring 116.

The inner ring 116 is bolted to a support plate 124 which is in turn connected to the chassis 18. Thus, the inner ring 116 remains stationary relative to the chassis 18.

The outer ring 118 is bolted to a support plate 126 which is in turn connected to an outer support frame 128. The support frame 128 is connected to the base frame 74 of the second rotating platform 22. Thus, when the outer ring 118 is rotated relative to the inner ring 116, the support frame 128 rotates the second rotating platform 22 about axis 21.

The turntables 96,98 and the rods 108 thus cooperate to present an upright, cylindrical pivot post or turret structure for both platforms 20,22. Both platforms can be rotated about the same pivot, yet the platforms can rotate independently of one another.

The motor 122 is bolted to the underside of stationary support plate 124 and includes a rotating pinion or drive gear (not shown). The periphery of the outer ring 118 is provided with gear teeth that intermesh with the drive gear of the motor 122. Thus, when the motor 122 rotates the drive gear, it rotates the outer ring 118 relative to the inner ring 116 and therefore rotates the support frame 128 and the first rotating platform 20.

The motors 106 and 122 are coupled with a conventional source of pressurized fluid and are controlled by a control assembly (not shown). The control assembly preferably includes manually-operated valves that control the delivery and direction of pressurized fluid to the motors and is mounted to the operator's platform. The control assembly also controls the operation of the hydraulic piston and cylinder assemblies 66 and 94.

The operators' station 26 is mounted to the end of the chassis 18 opposite the turntable 24 for supporting operators while loading poultry into the cages 14,16. The operators' station 26 includes a conventional hydraulic cylinder assembly (not shown) and a pair of rack and pinion assemblies 130

(see FIG. 3) for selectively raising or lowering the station 26 relative to the chassis 18. This permits the operators standing on the station 26 to more easily reach the cages 14,16 supported on the rotating platforms 20,22 during poultry loading.

The operation of the trailer apparatus 10 is best illustrated in FIGS. 7–10. Initially, the platform 20, which has already been loaded with a set of cages 14, is positioned in a poultry-loading position and the platform 22 is positioned in a cage-loading and unloading position as illustrated in FIG. 7. This permits the cages 14 to be loaded with poultry by the poultry catching device 12 and permits the platform 22 to receive a set of empty cages 16 from a forklift 132.

During loading of the cages 14, the tray 36 of platform 20 is shifted to and held in its tilted position by the cylinder assembly 66 so that the front edges of the cages 14 are elevated relative to their rear edges. This permits poultry that is being loaded into the cages 14 to slide to the rear of the cages 14. Conversely, while the cages 16 are being loaded on platform 22, tray 76 is held in its untilted position to present a level surface for receiving the cages 16.

Once the empty cages 16 have been placed on the platform 22 and while the cages 14 on the platform 20 are being loaded, platform 22 is rotated to an intermediate position as illustrated in FIG. 8. The tray 76 of platform 22 is held in its untilted position during this rotation so that the cages 16 are positioned closer to the turntable assembly 24 to prevent the apparatus 10 from tipping over.

Once the cages 14 have been filled, platform 20 is rotated to its cage-loading and unloading position and platform 22 is rotated to its poultry-loading position as illustrated in FIG. 9. During this rotation, the tray 76 of platform 22 is shifted to its tilted position indicated by the arrow 136 to elevate the front of the cages 16 and the tray 36 of platform 20 is shifted to its untilted position as illustrated by the arrow 138.

Thereupon, the loaded poultry cages 14 are unloaded by the forklift 132 and replaced with empty cages as illustrated in FIG. 10. The empty cages 16 are then loaded with poultry by the poultry catching device 12.

Although the invention has been described with reference to the preferred embodiment illustrated in the attached drawing figures, it is noted that equivalents may be employed and substitutions made herein without departing from the scope of the invention as recited in the claims.

Having thus described the preferred embodiment of the invention, what is claimed as new and desired to be protected by Letters Patent includes the following:

1. Apparatus for handling and positioning poultry cages, said apparatus comprising:

a mobile chassis;

a first rotating platform mounted to said chassis for rotational movement about a vertical axis, said first rotating platform including a cage-receiving tray supported thereon for holding a first set of poultry cages;

a second rotating platform mounted to said chassis for rotational movement about said axis, said second rotating platform including a cage-receiving tray supported thereon for holding a second set of poultry cages; and a turntable assembly for rotating said first and second rotating platforms about said axis independently of one another.

2. The apparatus as set forth in claim 1, said turntable assembly including a first turntable for rotating said first rotating platform and a second turntable for rotating said second rotating platform.

3. The apparatus as set forth in claim 2, said first and second turntables being operable for rotating one of said first and second rotating platforms to a poultry-loading position while independently rotating the other of said first and second rotating platforms to a cage-loading and unloading position.

4. The apparatus as set forth in claim 3, said first and second turntables each including an inner stationary ring connected to said chassis, an outer moveable ring connected to its respective first or second rotating platform and mounted for rotational movement about said inner ring, and a drive motor for rotating said outer ring for rotating its respective first or second rotating platform.

5. The apparatus as set forth in claim 4, said first and second turntables being coaxially mounted about said vertical axis.

6. The apparatus as set forth in claim 5, said first rotating platform including raising and lowering structure for selectively raising said first rotating platform relative to said chassis so that said second rotating platform can be rotated directly under said first rotating platform.

7. The apparatus as set forth in claim 6, said raising and lowering structure including structure for pivotally mounting said first rotating platform to said turntable assembly about a horizontal axis and a hydraulic cylinder assembly for pivoting said first rotating platform about said horizontal axis.

8. The apparatus as set forth in claim 1, said first and second rotating platforms each further including a base frame for carrying its respective cage-receiving tray, and means for tilting its cage-receiving tray relative to its base frame.

9. The apparatus as set forth in claim 1, further including an operator's station mounted to said chassis for supporting an operator.

10. The apparatus as set forth in claim 1, said first and second rotating platforms being mounted substantially the same vertical distance above said chassis so that their respective cage-receiving trays are positioned in substantially the same horizontal plane.

11. A rotating trailer apparatus for handling poultry cages, said trailer apparatus comprising:

a chassis;

a first rotating platform mounted to said chassis for rotational movement about a vertical axis, said first rotating platform including a cage-receiving tray supported thereon for holding a first set of poultry cages;

a second rotating platform mounted to said chassis coaxially with said first rotating platform for rotational movement about said vertical axis, said second rotating platform including a cage-receiving tray supported thereon for holding a second set of poultry cages; and a turntable assembly for rotating said first and second rotating platforms about said vertical axis, said turntable assembly including a first turntable for rotating said first rotating platform and a second turntable for rotating said second rotating platform, said first and second turntables being operable for rotating one of said first and second rotating platforms to a poultry-loading position while independently rotating the other of said first and second rotating platforms to a cage-loading and unloading position.

12. The trailer apparatus as set forth in claim 11, said first and second turntables each including an inner stationary ring connected to said chassis, an outer moveable ring connected to its respective first or second rotating platform and mounted for rotational movement about said inner ring, and a drive assembly for rotating said outer ring for rotating its respective first or second rotating platform.

13. The trailer apparatus as set forth in claim 11, said first and second rotating platforms each including a base frame, a tiltable tray mounted to said base frame, and a hydraulic cylinder connected between said base frame and said tray for tilting said tray.

14. The trailer apparatus as set forth in claim 11, further including an operator's station mounted to said chassis for supporting an operator.

15. The trailer apparatus as set forth in claim 11, said first rotating platform including raising and lowering structure for selectively raising said first rotating platform relative to said chassis so that said second rotating platform can be rotated directly under said first rotating platform.

16. The trailer apparatus as set forth in claim 15, said raising and lowering structure including structure for pivotally mounting said first rotating platform to said turntable assembly about a horizontal axis and a hydraulic cylinder assembly for pivoting said first rotating platform about said horizontal axis.

17. The trailer apparatus as set forth in claim 11, said first and second rotating platforms being mounted substantially the same vertical distance above said chassis so that their respective cage-receiving trays are positioned in substantially the same horizontal plane.

18. Apparatus for handling and positioning poultry cages, said apparatus comprising:

a mobile chassis;

a first rotating platform mounted to said chassis for rotational movement about a vertical axis, said first rotating platform including a cage-receiving tray supported thereon for holding a first set of poultry cages;

a second rotating platform mounted to said chassis for rotational movement about said axis, said second rotating platform including a cage-receiving tray supported thereon for holding a second set of poultry cages;

said first and second rotating platforms being mounted substantially the same vertical distance above said chassis so that their respective cage-receiving trays are positioned in substantially the same horizontal plane; and a turntable assembly for rotating said first and second rotating platforms about said axis independently of one another.

* * * * *